(12) United States Patent
Trouboul et al.

(10) Patent No.: US 11,263,451 B2
(45) Date of Patent: Mar. 1, 2022

(54) BIOMETRIC RECOGNITION METHOD

(71) Applicant: IDEMIA IDENTITY & SECURITY FRANCE, Courbevoie (FR)

(72) Inventors: Laurent Trouboul, Courbevoie (FR); Jean-François Siwek, Courbevoie (FR); Jean-Rémi Sandraz, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 287 days.

(21) Appl. No.: 16/561,778

(22) Filed: Sep. 5, 2019

(65) Prior Publication Data

US 2020/0074173 A1 Mar. 5, 2020

(30) Foreign Application Priority Data

Sep. 5, 2018 (FR) ..................... 18 57976

(51) Int. Cl.
*G06K 9/00* (2006.01)
*G06K 7/10* (2006.01)
*G02F 1/13357* (2006.01)

(52) U.S. Cl.
CPC ... *G06K 9/00617* (2013.01); *G02F 1/133621* (2013.01); *G06K 7/10732* (2013.01); *G06K 9/00114* (2013.01)

(58) Field of Classification Search
CPC ........... G06K 9/00617; G06K 9/00114; G06K 7/10732; G06K 9/2027; G06K 9/2018; G02F 1/133621; A61N 1/0456; A61N 1/0472
USPC ......................................................... 382/117
See application file for complete search history.

(56) References Cited

U.S. PATENT DOCUMENTS

| 8,644,562 | B2* | 2/2014 | Tosa | G06T 7/149 |
| | | | | 382/117 |
| 8,965,063 | B2* | 2/2015 | Hanna | G06K 9/00597 |
| | | | | 382/117 |
| 10,108,793 | B2* | 10/2018 | Danikhno | G06K 9/00597 |
| 10,614,332 | B2* | 4/2020 | Gousev | G06K 9/2027 |
| 10,740,605 | B2* | 8/2020 | Zhou | H04N 5/33 |
| 10,984,235 | B2* | 4/2021 | Gousev | G06K 9/0061 |
| 10,984,267 | B2* | 4/2021 | Li | G06K 9/00885 |
| 2003/0174868 | A1* | 9/2003 | Adachi | G06K 9/2027 |
| | | | | 382/118 |
| 2006/0029264 | A1* | 2/2006 | Utsunomiya | A61B 5/1171 |
| | | | | 382/117 |

(Continued)

OTHER PUBLICATIONS

Gaixia Xu et al, "Study on the fluorescence profiles of iris pigment epithelium and retinal pigment epithelium", Fifth International Conference on Photonics and Imaging in Biology and Medicine, 2007, vol. 6534, 9 pages.

*Primary Examiner* — Mahendra R Patel
(74) *Attorney, Agent, or Firm* — Muncy, Geissler, Olds & Lowe, PC

(57) ABSTRACT

A device for recognition from biometric characteristics extracted from at least one image of at least one iris of a candidate for recognition, the device having an image sensor with a field covering a capture zone in which at least one of the eyes of the candidate for recognition is intended to be located, and an illumination source of the capture zone, the illumination source emitting incident radiation in a wavelength range adapted to excite iris fluorescence and the sensor being arranged to be sensitive to iris fluorescence. Recognition method using such a device.

13 Claims, 1 Drawing Sheet

(56) References Cited

U.S. PATENT DOCUMENTS

| | | | |
|---|---|---|---|
| 2008/0181467 A1* | 7/2008 | Zappia | G06K 9/00604 382/117 |
| 2010/0070988 A1* | 3/2010 | Cohen | G06K 9/00778 725/10 |
| 2012/0117633 A1* | 5/2012 | Chakra | H04L 9/3231 726/7 |
| 2013/0222564 A1* | 8/2013 | Park | H04N 5/2354 348/77 |
| 2015/0009313 A1* | 1/2015 | Noda | A61B 5/1171 348/78 |
| 2016/0012218 A1* | 1/2016 | Perna | G06F 16/5838 726/18 |
| 2016/0012291 A1* | 1/2016 | Cleland | G06K 9/00597 382/117 |
| 2016/0092731 A1* | 3/2016 | Dainty | G02B 13/004 348/78 |
| 2016/0117544 A1* | 4/2016 | Hoyos | G06K 9/00604 348/78 |
| 2017/0020390 A1* | 1/2017 | Flitsch | A61B 3/112 |
| 2017/0113042 A1* | 4/2017 | Goodall | A61N 5/0622 |
| 2017/0132467 A1* | 5/2017 | Trinh | G06K 9/00899 |
| 2017/0164830 A1* | 6/2017 | Huang | G06T 7/0014 |
| 2018/0349683 A1* | 12/2018 | Mathieu | G06K 9/00288 |
| 2018/0349721 A1* | 12/2018 | Agrawal | G06K 9/00617 |
| 2019/0019026 A1* | 1/2019 | Jarosz | G06K 9/4671 |

\* cited by examiner

BIOMETRIC RECOGNITION METHOD

BACKGROUND OF THE INVENTION

Field of the Invention

The present invention relates to the field of biometric recognition and more particularly biometric recognition from irises.

Brief Discussion of the Related Art

A biometric recognition method conventionally comprises the following steps:
- capturing an image of one iris of a candidate for recognition;
- extracting, from the captured image, biometric characteristics corresponding to the characteristic point coordinates of the iris patterns;
- calculating a similarity score of the extracted biometric characteristics with respect to reference biometric characteristics stored in a memory of a personal data carrier such as an integrated circuit card or in a computer memory;
- validating or denying recognition based on the similarity score.

More and more people are using aesthetic or cosmetic lenses that cover the cornea around the pupil. These lenses prevent biometric recognition or may even lead to fraud if the patterns on the lenses are similar to those of an iris, the biometric characteristics of which have been stored as references.

In addition, retinal fluorescence is studied in Gaixia Xu et al, "Study on the fluorescence profiles of iris pigment epithelium and retinal pigment epithelium", Fifth International Conference on Photonics and Imaging in Biology and Medicine, edited by Qingming Luo, Lihong V. Wang, Valery V. Tuchin, Min Gu, Proc. of SPIE Vol. 6534, 65341N, 2007 (doi: 10.1117/12.741571).

Document US-A-2006/029264 describes a method for detecting an object in a fluid present in an eye or on the surface of one eye of a patient. It is planned to emit radiation to excite glucose fluorescence and detect it to determine the amount of glucose present on the surface of the eye. In addition, this document provides for the identification of the patient by iris recognition using infrared radiation.

SUMMARY OF THE INVENTION

One aim of the invention is to supply means for improving the reliability of the methods for the biometric recognition from irises.

For this purpose, according to the invention, a recognition device based on biometric characteristics extracted from at least one image of at least one iris of a candidate for recognition is provided, the device comprising an image sensor having a field covering a capture zone in which at least one of the candidate's eyes is intended to be located, and an illumination source of the capture zone, the illumination source emitting incident radiation in a wavelength range adapted to excite the iris fluorescence and the sensor being arranged to be sensitive to iris fluorescence.

Thus, the incident radiation is adapted to excite the fluorescence of the iris itself (and not that of a substance deposited thereon) so that an image of the fluorescence of the iris itself can be obtained. In such an image, the iris appears with all or part of its patterns, whereas if a lens is present on the eye of the candidate for recognition and its fluorescence is excited, the image obtained is uniform.

Preferably, the sensor is equipped with a filter to reject all or part of the excitation radiation.

This prevents radiation from the illumination source from affecting the fluorescence image.

According to a first embodiment, the illumination source is arranged to emit a blue light.

The blue light creates no fluorescence in the same wavelength range as that of the iris fluorescence.

According to a second embodiment, the source of illumination is an infrared laser preferably controlled to emit two pulses of a few femtoseconds.

The infrared laser provides effective fluorescence excitation and the use of short pulses makes it possible to reduce the risk of eye injury. More precisely, the fluorescence sought by using a femtosecond laser is a two-photon fluorescence (it is thanks to the energy provided by these two photons that fluorescence occurs).

Another object of the invention also is a method comprising the steps of:
- illuminating the iris of an eye of a candidate for recognition with a radiation to excite the iris fluorescence;
- capturing an image of the iris fluorescence;
- determining, from this image, whether the eye is equipped with a lens.

Other characteristics and advantages of the invention will become apparent from reading the following description of a particular non-restrictive embodiment of the invention.

BRIEF DESCRIPTION OF THE DRAWINGS

Reference is made to the appended drawings, wherein.

DETAILED DESCRIPTION OF THE PREFERRED EMBODIMENTS

Figure 1:
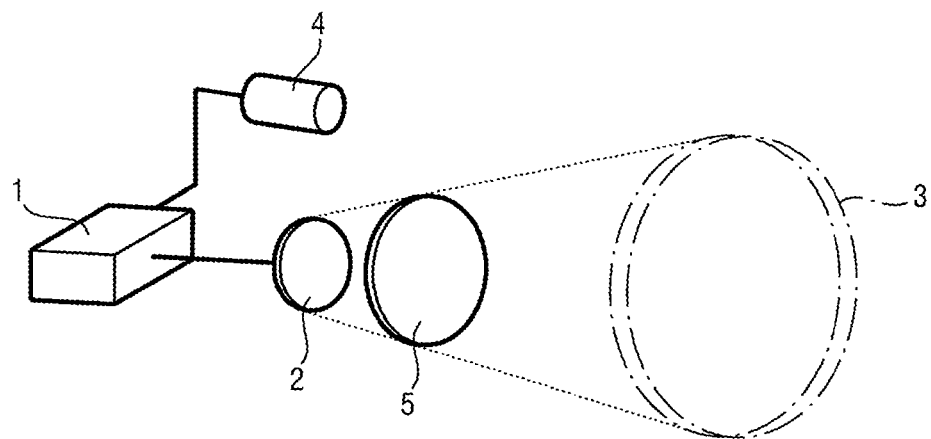
FIG. 1 is a schematic perspective view of a device according to a first embodiment of the invention.
Figure 2:
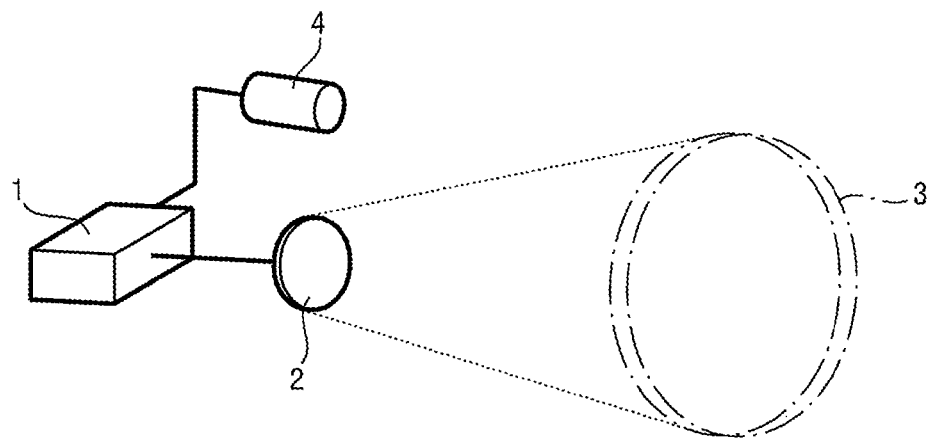
FIG. 2 is a schematic perspective view of a device according to a first embodiment of the invention.

With reference to FIGS. 1 and 2, the invention relates to a recognition device based on biometric characteristics extracted from at least one image of at least one iris of a candidate for recognition.

In both embodiments, the device comprises an electronic control unit 1 connected to an image sensor 2 having a field covering a capture zone 3 in which at least one of the eyes of a candidate for recognition, and more precisely the iris of that eye, is intended to be located. The electronic control unit 1 is here a computer or a computer terminal which comprises, in a manner known per se, a calculation module, such as a processor, and a memory containing one or more computer program(s), one of which allows the implementation of the method of the invention which will be described further in this description.

The device also includes an source 4 illuminating the capture zone 3. The illumination source 4 is connected to the electronic control unit 1 and is arranged to emit incident radiation in a wavelength range suitable for exciting the iris fluorescence.

The image sensor 2 is designed to be sensitive to iris fluorescence.

With reference to FIG. 1, and according to the first embodiment, the illumination source 4 is arranged to emit a blue light.

The image sensor 2 is preferably equipped with a filter 5 to reject all or part of the excitation radiation, as well as any radiation in a wavelength range different from that of the iris fluorescence. This makes it possible, if the candidate for recognition wears glasses, to prevent a fluorescence of the spectacle lens from altering the image of the iris and to prevent a part of the incident excitation radiation reflected by the glasses from altering the image of the iris.

With reference to FIG. 2, and according to the second embodiment, the illumination source 4 is an infrared laser that is advantageously controlled to emit two pulses of a few femtoseconds. The pulse duration is determined to achieve iris fluorescence excitation by simultaneously absorbing two photons.

The device does not have a filter here, but it is possible to add one if there is a risk that the laser pulses might cause fluorescence of the spectacle glass or if the excitation radiation might be reflected in the spectacle glass and affect the iris image.

The electronic control unit 1 is programmed to execute a program having instructions arranged for the implementation of a recognition method based on biometric characteristics extracted from at least one image of at least one iris of a candidate for recognition. The method includes the steps of:
  illuminating the iris of a candidate for recognition with iris fluorescence excitation radiation;
  capturing an image of the iris fluorescence;
  determining, from this image, whether the eye is equipped with a lens.

If the eye is equipped with a lens, the material constituting the lens will become fluorescent, in a substantially uniform manner over its entire surface. Then there will be no pattern on the image detected by the sensor. The control unit 1 is programmed to perform optical image processing, such as a study of contrasts in the image, to reveal if a lens is present.

If so, the electronic control unit interrupts the recognition process and issues an alert for an operator to intervene.

If no lens is present, the image is processed in a manner known per se to extract biometric characteristics from it that will be compared with biometric characteristics stored in a memory which the control unit 1 can access. Said memory can be:
  that of the control unit 1;
  that of a server which the control unit is connected to;
  that of an integrated circuit card inserted by the candidate into a reader connected to the control unit 1;
  that of an identity document readable by radio frequency (in the near field and for example in RFID).

Of course, the invention is not limited to the described embodiments but encompasses any alternative solution within the scope of the invention as defined in the claims.

In particular, the advantage of using a filter depends on the desired performance of the considered application.

Other wavelengths than those mentioned may be considered.

Iris fluorescence can be used to detect the presence of a lens and if no lens is present another image can be captured to perform the recognition. For example, the image is captured under different lighting conditions or using different wavelengths than those of fluorescence.

The invention claimed is:

1. A device for recognition from biometric characteristics extracted from at least one image of at least one iris of a candidate for recognition, the device comprising an image sensor having a field covering a capture zone in which at least one of the eyes of the candidate for recognition is intended to be located, and an illumination source of the capture zone, the illumination source emitting incident radiation in a wavelength range adapted to excite iris fluorescence and the sensor being arranged to be sensitive to iris fluorescence, wherein the device determines, from this image, whether the eye is equipped with a lens, the presence of a lens is detected by optical image processing, a study of contrasts in the image and, in the presence of a lens, the recognition method is interrupted and, if there is no lens, the image is processed to extract biometric characteristics from it which will be compared with stored biometric characteristics.

2. The device according to claim 1, wherein the sensor is provided with a filter for rejecting all or part of the excitation radiation.

3. The device according to claim 1, wherein the illumination source is arranged to emit a blue light.

4. The device according to claim 1, wherein the illumination source is an infrared laser.

5. The device according to claim 4, wherein the infrared laser is controlled to emit two pulses of a few femtoseconds.

6. A method for recognition from biometric characteristics extracted from at least one image of at least one iris of a candidate for recognition, the method comprising the steps of:
  illuminating the iris of an eye of a candidate for recognition with incident radiation in a wavelength range adapted to excite the iris fluorescence;
  capturing an image of the iris fluorescence;
  determining, from this image, whether the eye is equipped with a lens, wherein the presence of a lens is detected by optical image processing, a study of contrasts in the image and, in the presence of a lens, the recognition method is interrupted and, if there is no lens, the image is processed to extract biometric characteristics from it which will be compared with stored biometric characteristics.

7. The method according to claim 6, wherein illumination is obtained by projecting a blue light towards the iris.

8. The method according to claim 6, wherein illumination is obtained by projecting an infrared laser beam towards the iris.

9. The method according to claim 8, wherein the laser beam is projected as two close pulses, the pulses having a duration of the order of a few femtoseconds.

10. The method according to claim 6, wherein the presence of a lens is detected by optical image processing.

11. The method according to claim 6, wherein, in the presence of a lens, the recognition method is interrupted and, if there is no lens, the image is processed to extract biometric characteristics from it which will be compared with stored biometric characteristics.

12. The method according to claim 10, wherein the optical image processing comprises a study of contrasts in the image.

13. A method for recognition from biometric characteristics extracted from at least one image of at least one iris of a candidate for recognition, the method comprising the steps of:
  illuminating the iris of an eye of a candidate for recognition with incident radiation in a wavelength range adapted to excite the iris fluorescence, illumination being obtained by projecting towards the iris an infrared laser beam as two close pulses, the pulses having a duration of the order of a few femtoseconds;
  capturing an image of the iris fluorescence; and determining, from this image, whether the eye is equipped with a lens, wherein the presence of a lens is detected by optical image processing, a study of contrasts in the image and, in the presence of a lens, the recognition method is interrupted and, if there is no lens, the image is processed to extract biometric characteristics from it which will be compared with stored biometric characteristics.

* * * * *